United States Patent
Grubic (12)

(10) Patent No.: US 6,689,239 B1
(45) Date of Patent: Feb. 10, 2004

(54) RUBBER FLOORING AND METHOD FOR PRODUCING RUBBER FLOORING FOR HEAVY ANIMAL MAINTENANCE AND CARE FACILITIES

(76) Inventor: Joe Grubic, 333 Cedar Ridge Dr., China Spring, TX (US) 76633

( * ) Notice: Subject to any disclaimer, the term of this patent is extended or adjusted under 35 U.S.C. 154(b) by 28 days.

(21) Appl. No.: 10/225,496

(22) Filed: Aug. 21, 2002

(51) Int. Cl.[7] .......................... E04F 15/10; E04F 15/16; E04F 15/22; B32B 31/00
(52) U.S. Cl. ...................... 156/71; 156/279; 156/281; 52/177; 52/403.1; 52/515; 52/741.3; 52/746.1; 427/208; 427/300; 427/400; 427/407.1
(58) Field of Search ...................... 52/177, 181, 403.1, 52/408, 411, 515, 516, 560, 741.3, 741.4, 741.41, 745.05, 746.1; 427/207.1, 208, 299, 300, 301, 302, 340, 399, 400, 407.1

(56) References Cited

U.S. PATENT DOCUMENTS 5,411,352 A * 5/1995 Eren .......................... 404/31

* cited by examiner

*Primary Examiner*—Curtis Mayes
*Assistant Examiner*—Chan Sing Po
(74) *Attorney, Agent, or Firm*—David G. Henry

(57) ABSTRACT

The invention is a method for encapsulating rubber mats to provide an extremely cost-effective and a more durable, alternative to flooring traditionally composed of multiple layers of rubber. Such proposed flooring can withstand frequent traffic of heavy animals while ensuring a high degree of animal safety and problem-free mobility. Use of such durable flooring via encapsulating rubber mats of the present invention may be suitable to a diverse array of situations requiring a hard wearing material, such as zoos, veterinary hospitals, animal transport trailers, quality stall systems, healthcare, arena footing, supermarkets, gymnasiums and schools, as well as other commercial, institutional and sporting uses.

15 Claims, No Drawings

RUBBER FLOORING AND METHOD FOR PRODUCING RUBBER FLOORING FOR HEAVY ANIMAL MAINTENANCE AND CARE FACILITIES

BACKGROUND OF THE INVENTION

1. Field of the Invention

The present invention relates to improved flooring surfaces, and in particular to a method for producing highly cost-effective, improved flooring surfaces for animal care, maintenance or transport facilities and equipment.

2. Background Information

The floor or ground surfaces upon which an animal regularly stands or walks have immediate and long-term effects on the animal. Animals that typically weigh much more than the average person pose unique problems when constructing suitable flooring. Flooring which is adequate for people, may not be so for animals, either form an animal health standpoint, or from a durability standpoint.

Concrete and other smooth, hard flooring for various animal environment, e.g., zoos, lactating barns for cows, horse and cattle trailers, etc., has been around for many years. However, such flooring poses many immediate and long-term problems for the animals, especially heavy animals in a high traffic areas.

Hard (substantially non-resilient) and smooth concrete surfaces allow for even weight distribution across the entire area where the animal, e.g., hoof, contacts the surface. However, constant repetitive contact on hard, unforgiving and even surfaces can cause a host of injuries, e.g., swollen hocks or knees, mastitis, solar ulcers, etc. Likewise, constant repetitive contact on hard, unforgiving and uneven surfaces can also cause an array of animal injuries, e.g., damage to the internal components of the hoof. Furthermore, concrete floors are notorious for being slippery, especially when wet or with the presence of animal feces. Such slippery concrete surfaces cause injury or loss of animal life, often at an alarming rate.

Grooving concrete can be beneficial to provide lateral stability, but does very little for normal locomotion and footing. Proper animal locomotion and animal safety, not to mention other daily activities, require good and proper traction. Concrete flooring can be re-grooved, as needed, but this does not solve the aforementioned problems.

Scabbling concrete floors with a concrete planer (rotating knives moving laterally to cut the concrete) is another alternative, but the resulting flooring has ridges and points from the inconsistent depth of the cut. These ridges and points create palpable pressure points, which means the animals can feel such uneven ridges. Thus, as a result of the animal's weight being concentrated on certain high points of the floor, the foot may experience discomfort, pain and long-term injury.

Rubber flooring is the benchmark for durability and safety in the large animal flooring context. Not only does rubber flooring as presently used in zoos and the like provide both the smooth and resilient surface that best serve heavy animals' needs, it is one of the few materials that can be effectively disinfected and is free of toxicity. Also, such flooring can be easily cleaned.

Presently, rubber flooring for animal holding and passage areas is installed through a highly time-consuming and costly process. Thin layers of rubber-containing compounds are applied, one after the other, until the desired thickness is achieved. Each layer must be allowed to adequately cure before moving to the application of the next layer.

This process requires the delivery of many different chemicals and ingredients to a remote job sight, special preparation of the chemicals ingredients by special equipment and methodology, and involves many workers who must be specially skilled in the process.

As a result, rubber flooring as is currently known in the zoo and related contexts, is so expensive, that this beneficial tool for animal care is often foregone, out of shear budgetary necessity.

The use of rubber mats to replace the layered rubber flooring described above may seem to be a logical alternative. However, mats tend to shift, thereby creating ridges against which animals may stumble, and many animals will chew the exposed edges of rubber mats to considerable danger to their health. Furthermore, many rubber mats are simply not of the desirable resilience for heavy animals. A mat that is too soft may feel good to the touch but typically lacks in durability and longevity. (For example, research shows that milk production increases significantly when a cow is comfortable when lying down.) Soft rubber matting can also cause torsion injuries to animals, including, for examples, pasterns, knees and stifles. Conversely, a rubber mat or rubber flooring that is too hard may have remarkable durability and longevity, but is dangerously slippery, like soft concrete surfaces. (For example, rubber mats should have different durometer ratings [measure of hardness] depending on the use, e.g., extensive testing has shown that a mater between 60–65 durometer is ideal for equine use.)

In view of the foregoing, it would well-serve those who care for heavy animals, as well as the animals themselves, to provide an alternative flooring material and/or method for producing flooring material, the use or practice of which provides a near-ideal flooring surface (exhibiting the desired degree of resilience, durability, and ease of cleaning) at a cost which is within reach of most all who care for animals (in fact, less than the long-term veterinary expense arising from using concrete flooring instead).

SUMMARY OF THE INVENTION

In view of the foregoing, it is an object of the present invention to provide a reliable and effective alternative to concrete flooring for heavy and high animal traffic areas, like in zoos.

It is another object of the present invention to provide a novel and unobvious rubber flooring for heavy and high animal traffic areas.

It is another object of the present invention to provide a more efficient method of producing rubber flooring than the current process of pouring multiple layers of rubber over a period of time.

It is an object of the present invention of rubber flooring to provide a very cost-effective, yet equally beneficial alternative to present rubber flooring as is used in animal maintenance and care facilities.

It is an object of the present invention to provide a safe flooring for animal locomotion whereby there are no edges to trip or loose footing thereof.

It is another object of the present invention to provide a method for encapsulating rubber mats to produce a better alternative to current rubber flooring, especially in the context of high traffic of heavy animals.

In satisfaction of the above and related objects, the present invention provides an improved rubber flooring and method for producing same which is both cost effective and of superior performance characteristics in the context of animal care and maintenance facilities. The flooring consists of rubber mats which are encapsulated in substantially the same rubber-containing compounds as are now used to produce rubber flooring by conventional methods. However, because much of the volume of a floor produced according to the present method is occupied by the already-formed rubber mat, the time to install the flooring is substantially reduced, and with it the costs of labor, installation materials, and equipment usable.

Once a floor is produced according to the present invention, it provides indistinguishable characteristics and performance from that of existing rubber floor installations. The cost-effective nature of the flooring and method of the present invention is such that uses, previously ruled out because of cost considerations, may now be added. Such would include uses in even inexpensive horse and cattle trailers, just to give one example.

Through use of the presently described product and associated methods, the present inventor has successfully and drastically reduced the square foot cost of current rubber flooring from approximately $30 to $1.15—a more than 96% reduction in rubber flooring expense.

The cost savings alone from use of the method and application of the present invention will easily exceed millions of dollars each year for zoos and other animal care facilities.

DETAILED DESCRIPTION OF THE PREFERRED EMBODIMENT

The present invention includes highly cost-effective methods for encapsulating rubber mats to yield a durable and resilient rubber flooring for heavy animals in high traffic areas at zoos and other animal care and maintenance facilities. Such encapsulation obviates toxicity in the materials used. The end product is sealable so as to prevent the invasion of bacteria. It is also chemical, heat, oil, fat, and stain-resistant.

The encapsulated rubber mats also have superior sound-absorbing characteristics. In life-cycle costs, rubber flooring continues to be the lowest-cost alternative because of its longevity and easier, less-expensive maintenance. Furthermore, the form and shape of the encapsulation do not yield any edges to trip on or for animals to chew or ingest.

Current means of making rubber flooring include multiple applications of layers of rubber. The present invention, which is much more cost-effective and much less time consuming but more durable and with greater longevity, is achieved by pouring rubber over pre-placed rubber mats.

The present method for encapsulating rubber mats requires only components which are readily available commercially.

The present inventor has endeavored to provide what is now believed to be the preferred embodiment and best mode of the present invention, however, due to the simplicity of the assembled system, many variations and/or substitutions with respect to individual components may be made, while still practicing the present invention. Also, the terminology used herein is for the purpose of description and not of limitation. A description of the presently believed preferred embodiment follows:

Preparing the concrete starts with scrubbing the concrete with a solution of muratic acid, rinsing, scrubbing the concrete with a solution of tri-sodium phoshate (TSP), and then rinsing again. The rubber mats to be pre-placed are also scrubbed with the TSP solution, rinsed and allowed to dry.

A primer coat of epoxy is then rolled over the concrete. While the epoxy is still wet, the rubber mats are laid on the surface with small gaps between them, which are also coated with epoxy.

Next, prepare a SUNFLEX sand mixture, which, for the present application, is a mixture of: (1) SUNFLEX solvent free base and water (SUNFLEX base 4 parts and water 1 part by volume); and (2) and equal volume of sand. SUNFLEX is a liquid, elastomeric urethane solution which is available from GoldenLook International, Inc. of Euless, Tex. Clearly, a functionally equivalent, substitute material may be used, if desired.

Let the SUNFLEX mixture stand until it thickens. Then pour this SUNFLEX base sand mixture around the outer edges of the mats and cove it at an angle up to the top edge of the mat. Also pour this sand mixture between the gaps of the mats.

Prime the top surface of the mats with a mixture of resin and cure until it sets up to a tacky point.

Next, float an encapsulating SUNFLEX mixture (without sand) over the mats to within a thickness of $\frac{1}{16}$" to $\frac{1}{8}$" thickness. This encapsulating SUNFLEX mixture consists of four parts SUNFLEX to one part water. After the encapsulating mixture is applied, one applies a thin layer of finely ground rubber particles sufficient to cover the surface. After this step, cure out takes 6 to 8 hours naturally, or approximately twice as fast using an accelerator. After cure out of the SUNFLEX base, remove by any means all loose, unbonded ground rubber. At this point, two coats of aromatic Urethane Sealer are applied, the second coat being applied after the first has dried.

A tremendous advantage realized through the method and application of the present invention is the cost savings compared to current rubber floorings. Whereas current rubber flooring runs approximately $30 per square foot, the present invention can yield an even more durable rubber flooring at a square foot cost of approximately $1.15.

It should be emphasized that, however simple the application taught herein may be, the same may be used in so many other practical contexts. For examples, in zoos, lactating barns for cows, animal transport vehicles, quality stall systems, equine use, bovine use, healthcare, arena footing, gymnastic flooring, etc.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method for applying a rubber-like flooring to an existing concrete surface comprising the steps of:
   selecting two or more rubber-like mats, and arranging said one or more rubber mats on said existing concrete surface to approximate the area to be covered by the rubber flooring with small gaps between them;
   prepare an elastomeric urethane solution mixture comprising a solvent free, elastomeric urethane solution and sand;
   and apply a sufficient measure of said urethane solution mixture to said one or more rubber mats to encapsulate said one or more rubber mats and filling said small gaps between the mats.

2. A rubber floor produced according to the steps of:

selecting two or more rubber-like mats, and arranging said one or more rubber mats on said existing concrete surface to approximate the area to be covered by the rubber flooring with small gaps between them;

prepare an elastomeric urethane solution mixture comprising a solvent free elastomeric urethane solution and sand;

and apply a sufficient measure of said urethane solution mixture to said one or more rubber mats to encapsulate said one or more rubber mats and filling said small gaps between the mats.

3. A method of encapsulating rubber mats comprising the steps of:

(a) prepare the concrete by scrubbing the concrete with a solution of muratic acid, rinsing, scrubbing the concrete with a solution of tri-sodium phoshate (TSP), and then rinsing again;

(b) scrubbing the rubber mats with the TSP solution, rinsing and allow them to dry;

(c) apply a primer coat of epoxy over the concrete, and before it dries lay the rubber mats on the surface with small gaps between them, which are also coated with epoxy;

(d) apply a bead of caulk at the outer edges of the mats where the edges of the mats will meet an elastomeric urethane base—sand cove;

(e) pour a solvent free base of elastomeric urethane solution and sand mixture around the outer edges of the mats and cove it at an angle up to the top edge of the mats, and pour this sand mixture between the gaps of the mats;

(f) prime the top surface of the mats with a primer coat of epoxy;

(g) float a coat of a solvent free base of elastomeric urethane solution over the mats to a certain thickness;

(h) applying a thin layer of finely ground rubber to cover the surface of the urethane solution;

(i) remove substantially all loose and unbonded ground rubber;

(j) apply two coats of aromatic urethane sealer.

4. The method of claim 3 wherein the tri-sodium phosphate (TSP) solution has a 1 to 1 TSP to water ratio.

5. The method of claim 3 wherein the epoxy primer has a 2 to 1 resin (Part A) to cure (Part B) ratio.

6. The method of claim 3 wherein the epoxy components are mixed for a period of two minutes.

7. The method of claim 3 wherein the rubber mats are placed over the wet epoxy at a distance between ¼" and ½" to the next rubber mat.

8. The method of claim 3 wherein the thickness of the applied bead of caulk is the same thickness as the mats.

9. The method of claim 3 wherein the elastomeric urethane solution sand mixture is comprised of 1 gallon of solvent free elastomeric urethane solution and 1 quart of water, mixed throughly with a mixing paddle on a drill, to an equal amount of sand.

10. The method of making the sand mixture in claim 9 wherein the mixture is to set for 5 minutes, or until it reaches a thickened state.

11. The method of applying the elastomeric urethane solution mixture in claim 3 whereby the elastomeric urethane solution mixture is poured out around the outer edges of the mats and coved at an angle to the edge of the mat.

12. The method of applying the elastomeric urethane solution mixture in claim 3 whereby the elastomeric urethane solution mixture is poured out into and filling the gaps between the mats.

13. The method of applying the encapsulating SUNFLEX coat in claim with either a ¼" serrated squeegee or a ¼" serrated trowel over the mats to a settling level of 1/16" to ⅛" in thickness.

14. The method of applying the encapsulating elastomeric urethane coat in claim 3 wherein while the surface areas are still wet broadcast the ground rubber to excess over the entire area.

15. The method of applying two coats of aromatic Urethane Sealer in claim 3 wherein the second coat can be rolled when the first is dry to the touch.

* * * * *